United States Patent Office 3,442,853
Patented May 6, 1969

3,442,853
HEAT STABILIZATION OF POLYVINYL FLUORIDE
Saul Gobstein, University Heights, Ohio, assignor to Ferro Corporation, Cleveland, Ohio, a corporation of Ohio
No Drawing. Filed May 10, 1967, Ser. No. 637,329
Int. Cl. C08f 45/58, 29/16; C08g 51/58
U.S. Cl. 260—45.95                                        3 Claims

ABSTRACT OF THE DISCLOSURE

This invention relates to certain novel poly(vinyl fluoride) compositions, and the stabilization of poly(vinyl fluoride) resin compositions against heat degradation by incorporating therein from about 0.1 to about 5.0 parts by weight, per 100 parts by weight of resin, of a member selected from the group consisting of a 2,2'-thiobis(para-alkylphenol), dialkyl pentaerythritol diphosphite, and mixtures of a 2,2'-thiobis(para-alkylphenol) and a dialkyl pentaerythrityl diphosphite.

Novel poly(vinyl fluoride) compositions within the scope of the present invention consist essentially of a poly(vinyl fluoride) resin and from about 0.1 to about 5.0 parts by weight, per 100 parts by weight of resin, of a stabilizer as described above. They may also include suitable pigments, solvents, plasticizers, extenders and the like. When employed in coating formulations, the novel compositions of the present invention have been found to exhibit greatly improved adhesion characteristics.

BACKGROUND OF INVENTION

This invention relates to poly(vinyl fluoride) compositions and more particularly to the stabilization of such compositions against heat degradation.

Poly(vinyl fluoride) resins differ from other halogenated polymers in being quite resistant to degradation by ultraviolet light (in the wave length range found in incident sunlight at the earth's surface). Poly(vinyl fluoride) differs also from resins such as poly(vinyl chloride) in that the thermal degradation of the former resin is not significantly affected by the addition of hydrogen halide acceptors, whereas such compounds form a very prominent class of heat stabilizers for the latter resin.

Poly(vinyl fluoride) heat degradation differs from polyolefin heat degradation in that the latter appears to be primarily an oxidative process, while the former proceeds essentially in dehydrohalogenation. Thus the degradation reaction of poly(vinyl fluoride) resins is not an oxidative process equivalent to that observed in polyolefins because dehydrohalogenation occurs, yet hydrogen halide acceptors such as those employed to stabilize poly(vinyl chloride) resins are not generally effective in preventing degradation of poly(vinyl fluoride) resins.

Certain 2,2'-thiobis(para-alkylphenols) are disclosed and claimed in U.S. Patent 3,082,187 for use in polyethylene where they were employed with certain tri-substituted organic phosphites, as antioxidants to prevent oxidative degradation of the polyethylene. Various derivatives and salts of 2,2'-thiobis(para-alkylphenols) are known to be useful in the stabilization of polyolefins against degradation and are widely used in commercial applications. Previous attempts to stabilize other halogenated vinyl resins by incorporating such materials into test formulations indicated that such materials were ineffective in stabilizing chlorinated vinyl resin compositions against either heat or light degradation. In general 2,2'-thiobis(para-alkylphenols) were found to be totally unsuitable for use in previously known halogenated vinyl resin compositions.

In the past, dialkyl pentaerythritol diphosphites have been found to be useful in stabilizing certain previously known halogenated vinyl resin compositions. When used in such compositions, the dialkyl pentaerythritol diphosphite was usually employed as a minor component of the stabilizer system to improve the color of the product during the early stages of the heating cycle of manufacturing processes employing such resins.

SUMMARY OF INVENTION

It has now been found that fluorinated vinyl resin compositions can be stabilized against degradation due to heat, by incorporating in said resin from about 0.1 to about 5.0 parts by weight, per 100 parts by weight of resin, of a member of the group consisting of 2,2'-thiobis(para-alkylphenol) having the general formula:

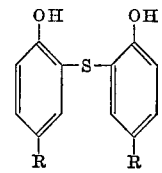

wherein each R is an alkyl radical having from 2 to 20 carbon atoms, and preferably 4 to 12 carbon atoms; a dialkyl pentaerythritol diphosphite, having the general formula:

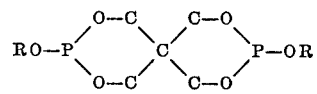

wherein each R is an alkyl radical, and preferably a straight chain alkyl radical having 6 to 20 carbon atoms, and mixtures of such a thiobis(para-alkylphenol) and such a dialkyl pentaerythritol diphosphite. For convenience hereinafter, the word "parts" as used in this specification, and in the appended claims shall be understood to mean "parts by weight per 100 parts by weight of resin," unless some other meaning is clearly intended.

Many attempts have been made to incorporate into poly(vinyl fluoride) compositions, materials which would prevent or at least inhibit the thermal degradation of the resins, especially during extreme heating such as that encountered in the curing of the resin. Stabilizers such as pentaerythritol, metal soaps of fatty acids etc. Which were previously known to be effective in inhibiting heat degradation of other halogenated vinyl compositions, were found to be unsuitable even for minimal curing cycles of 2 to 5 minutes at 400 to 700° F. encountered in curing poly(vinyl fluoride) compositions sprayed onto metal substrates.

The problems encountered in the heat stabilization of much thicker films produced by other molding techniques, such as casting etc., are of course even more difficult, because of the more intense curing cycles necessary to insure complete curing of the polymer, e.g. usually in excess of 10 minutes and often as long as 20 minutes, at temperatures from 400 to 700° F.

The novel poly(vinyl fluoride) compositions of the present invention are composed of a poly(vinyl fluoride) resin, from about 0.1 to about 5.0 parts of a member selected from the group consisting of a 2,2'-thiobis(para-alkylphenol), a dialkyl pentaerythritol diphosphite, and mixtures of a 2,2'-thiobis(para-alkylphenol) and a dialkyl pentaerythritol diphosphite. In addition these compositions may also include suitable fillers, pigments, solvents, plasticizers, extenders, and the like, to the same extent that such materials can be incorporated into unstabilized poly(vinyl fluoride) resins.

As examples of plasticizers which may be employed in the novel compositions of the present invention mention may be made of dimethyl phthalate and dibutyl phthalate to name but two, it being understood that a large number of well known phthalate esters and other well known ester type plasticizers can also be employed. As examples of solvents which are useful in the formulation of compounds within the scope of the present invention, mention may be made of solvents such as dimethylformamide, dimethylsulfoxide, dimethylacetamide, and a number of other common solvents which are already well known for their ability to solvate the poly(vinyl fluoride) resins.

Most of the tests conducted on compositions within the scope of the present invention were conducted on coating type compositions which contained titanium dioxide as a pigment. A valid observation of comparative heat stability is only possible where all samples are initially of the same color, and in pigmented compositions, the most distinct visible comparison of results is obtained with titania pigmented compositions. In any event, it should be obvious that almost any pigment normally employed in conjunction with other halogenated vinyl resins, can be incorporated into the compositions of the present invention, and that selection of a pigment is not critical to the present invention, although the rate of degradation may vary with type or quality pigment employed.

It is well known that poly(vinyl fluoride) polymers are very resistant to flow, and in general such polymers have not heretofore been injection molded or extruded on a commercial scale. The most common forming methods are casting from solution e.g. by Knife coating, roller coating, reverse roller coating spraying and the like, most of which require that a significant concentration of plasticizer and/or solvent be employed with the poly(vinyl fluoride) polymer, to enhance their flow properties. Because of the very high cost of these polymers, their use has been fairly well restricted to application which require one or more of the outstanding physical properties associated with these polymers, such as high resistance to various corrosive chemicals, high abrasion resistance, high impact strength, and/or outstanding weatherability. In such cases the extremely high cost of the polymer is often a secondary consideration, if the required physical property is obtained, and/or the coating necessary for protection is so thin that it costs less than the much thicker and heavier coating required if some other polymer is employed.

Poly(vinyl fluoride) compositions are usually spray coated, and the use of appreciable amounts of fillers and/or extenders has been rather limited, but fillers and extenders such as those commonly incorporated into other halogenated vinyl compositions, can usually be incorporated into poly(vinyl fluoride) compositions, and heat stability testing on fillers containing poly(vinyl fluoride) compositions indicates that the effect, if any, of ordinary fillers on the order of thermal stability of various experimental systems employed in the stabilization of poly(vinyl fluoride) composition is minimal. It will be seen hereinafter that 40 parts of titania were incorporated into 100 parts of poly(vinyl fluoride) resin without adverse effects and that the improvement obtained by use of the stabilizer system of the present invention, is so outstanding, that samples subjected to a heating cycle several times longer than that normally required to cure the polymer, exhibit no visible sign of degradation.

It has previously been noted that the dialkyl pentaerythritol diphosphites useful in the practice of the present invention, are those in which the alkyl group has from 6 to 20 carbon atoms. The choice of a particular alkyl radical within the range defined has very little effect on stabilization per se; and in general, the choice is dictated by the compatibility of the particular dialkyl pentaerythritol diphosphite in the overall poly(vinyl fluoride) composition. Thus where higher concentrations of stabilizer are employed, one must give greater consideration to the effect of these groups on compatibility with the resin. In general, longer straight chain alkyl groups are better for stability than shorter branch chain groups, but the latter are in general more compatible. That is to say, just as in the compounding of other halogenated vinyl compositions, the choice of solvents and plasticizers, etc., in formulating a poly(vinyl fluoride) composition is dictated by the properties they will impart to the compositions and the end use for which the formulation is to be employed, and the choice of a dialkyl pentaerythritol diphosphite, would be made on the basis of the level at which it is to be employed, and its compatibility with the plasticizers, solvents and other components of the composition.

PREFERRED EMBODIMENT

In the preferred embodiment of the present invention 0.2 to 3.0 parts of distearyl pentaerythrityl diphosphite, and 0.5 to 3.0 parts of 2,2'-thiobis(para-1,1,3,3-tetramethylbutylphenol) are incorporated into 100 parts by weight of poly(vinyl fluoride) resin, together with at least 100 parts by weight of plasticizer and/or solvent, though the solvent and/or plasticizer can be omitted where the composition is to be molded or formed by some method other than solution coating.

In order to evaluate the efficiency of the preferred stabilizing materials of the present invention, a series of tests were performed using the following test formulation:

Test formulation A (Pigmented Test Formula)

| | Parts |
|---|---|
| Poly(vinyl fluoride) polymer | 100 |
| Dimethyl phthalate | 200 |
| Titanium dioxide | 40 |
| Stabilizer, as noted. | |

Test formulation B (Clear Test Formula)

| | Parts |
|---|---|
| Poly(vinyl fluoride) polymer | 100 |
| Dimethyl phthalate | 200 |
| Stabilizer, as noted. | |

In the first series of tests a large number of stabilizers known to be useful as heat stabilizers in poly(vinyl chloride), were incorporated into the above formulation, either alone or in combination with other stabilizers, but in every test the total stabilizer level was maintained at a constant level of 1.5 parts. The incorporation of such previously known poly(vinyl chloride) heat stabilizers yielded extremely poor results in every instance, and these results were found to be quite consistant no matter what type of poly(vinyl chloride) heat stabilizer was employed e.g. metal soaps, polyols such as pentaerythritol, or antioxidants.

It has previously been noted that, poly(vinyl fluoride) polymers are presently being used almost exclusively in the coating and casting fields, and in fact industrial finishes and coatings are the only significant areas of present commercial application. In line with this it should be noted that Test Formulations A and B are typical poly(vinyl fluoride) coating formulations and most of the tests were conducted on a thin film of the poly(vinyl fluoride) test composition, which had been coated onto a metallic substrate such as aluminum or steel.

In general the following test procedure was followed:

An aluminum or steel sheet was coated with a 1 mil film of the poly(vinyl fluoride) test composition, using draw down application techniques, and the polymer was fused, in an oven at 450 to 500° F. for aluminum, and 550 to 620° F. for steel. The actual temperature was a function of the thickness of the metal, but in all cases reported below, the comparative results were obtained using metal substrates of approximately the same thickness and all samples were exposed in the oven simultaneously. After exposure in the oven, as described above, each series of plates was then removed from the oven, after a predetermined interval of time, and checked for heat stability and for adhesion of the film to the substrate. The data obtained in these tests, as set forth for purposes of comparison in Tables I and II below, was based on a standard formula weight of 300 parts of Test Formulation B to which the varying amounts of stabilizer were added as detailed in each table. Table I is a comparison of the results observed where the test formulations were coated on an aluminum substrate, and Table II is a comparison of the results observed where the test formulations have been applied to a steel substrate, in both tables results are given as: ND meaning no appreciable discoloration, DEG meaning degraded as judged by discoloration, and SD meaning slightly degraded.

TABLE I

| Sample | Stabilizer | Parts of stabilizer | Condition of sample after— | | | | |
|---|---|---|---|---|---|---|---|
| | | | 5 min. | 7 min. | 10 min. | 15 min. | 20 min. |
| 1 | A [1] | 1.5 | ND | ND | SD | DEG | DEG |
| 2 | A [1] | 1.0 | ND | ND | DEG | DEG | DEG |
| 3 | A [1] | 0.5 | ND | SD | DEG | DEG | DEG |
| 4 | {A [1] / B [2]} | {1.0 / 0.5} | ND | ND | ND | ND | ND |
| 5 | {A [1] / C [3]} | {1.0 / 0.5} | ND | ND | ND | DEG | DEG |
| 6 | No stabilizer | | ND | DEG | DEG | DEG | DEG |

[1] A = ortho, ortho'thiobis(para 1,1,3,3-tetramethylbutylphenol).
[2] B = distearyl pentaerythritol diphosphite.
[3] C = pentaerythritol.

TABLE II

| Sample | Stabilizer | Parts of stabilizer | Condition of sample after— | | | | |
|---|---|---|---|---|---|---|---|
| | | | 5 min. | 7 min. | 10 min. | 15 min. | 20 min. |
| 1 | A [1] | 1.5 | ND | ND | ND | DEG | DEG |
| 2 | A [1] | 1.0 | ND | ND | SD | DEG | DEG |
| 3 | A [1] | 0.5 | ND | ND | DEG | DEG | DEG |
| 4 | {A [1] / B [2]} | {1.0 / 0.5} | ND | ND | ND | ND | DEG |
| 5 | {A [1] / C [3]} | {1.0 / 0.5} | ND | ND | DEG | DEG | DEG |
| 6 | None | | ND | DEG | DEG | DEG | DEG |

[1] A = ortho, ortho'thiobis(para 1,1,3,3-tetramethylbutylphenol).
[2] B = distearyl pentaerythritol diphosphite.
[3] C = pentaerythritol.

From the foregoing tables it should be obvious that particularly excellent results were obtained with sample No. 4 in each table. The tables also clearly indicate that the addition of 2,2'-thiobis(para 1,1,3,3-tetramethylbutylphenol) by itself imparts greatly improved stability to the poly(vinyl fluoride) composition. Similar tests subsequently conducted with distearyl pentaerythritol diphosphite indicated that it was also useful by itself in stabilizing poly(vinyl fluoride) compositions against degradation due to heat.

It will, of course, be obvious to those skilled in the art that similar heat stabilization can be imparted to other types of poly(vinyl fluoride) compositions by incorporation of the novel stabilizers of the present invention. Thus, other tests were conducted to evaluate the effect of various types of plasticizers, solvents, pigments, extenders and the like, and in every case where the novel stabilizer compositions of the present invention were incorporated into the poly(vinyl fluoride) composition, they imparted to those compositions greatly improved heat stability.

It will therefore be understood that a wide variety of substitutions, modifications and changes can be made in the compositions, materials, methods and processes of the present invention without departing from the scope thereof, and it is my intention to be limited only by the appended claims. As my invention,

I claim:

1. A novel composition of matter comprising a poly(vinyl fluoride) resin and, as a heat stabilizer, from about 0.1 to about 5.0 parts by weight, per 100 parts by weight of resin, of ortho, ortho-thiobis(p-1,1,3,3-tetramethylbutylphenol).

2. The composition according to claim 1 wherein said composition also contains from about 0.1 to about 5.0 parts by weight per 100 parts by weight of resin of a dialkyl pentaerythritol diphosphite, wherein each alkyl radical contains from 6 to 20 carbon atoms.

3. The composition according to claim 2 wherein said dialkyl pentaerythritol diphosphite is distearyl pentaerythritol diphosphite.

References Cited

UNITED STATES PATENTS

| 2,193,613 | 3/1940 | Alexander | 260—33.8 |
| 2,360,540 | 10/1944 | Bent et al. | 260—33.8 |
| 2,847,443 | 5/1956 | Hechenbleikner et al. | 260—45.8 |
| 2,971,968 | 2/1961 | Nicholson et al. | 260—45.95 |

OTHER REFERENCES

Billmeyer, Textbook of Polymer Chemistry, 1957, p. 314.

HOSEA E. TAYLOR, JR., Primary Examiner.

D. J. BARRACK, Assistant Examiner.

U.S. Cl. X.R.

117—132; 260—31.8, 41, 45.8